United States Patent

Brown

[11] Patent Number: 5,697,248
[45] Date of Patent: Dec. 16, 1997

[54] LIQUID LEVEL SENSOR

[75] Inventor: Richard Hunter Brown, Chesham, England

[73] Assignee: The Whitaker Corporation, Wilmington, Del.

[21] Appl. No.: 185,836
[22] PCT Filed: Jul. 27, 1992
[86] PCT No.: PCT/GB92/01393
  § 371 Date: May 10, 1994
  § 102(e) Date: May 10, 1994
[87] PCT Pub. No.: WO93/02340
  PCT Pub. Date: Feb. 4, 1993

[30] Foreign Application Priority Data

Jul. 25, 1991 [GB] United Kingdom ............ 9116092
Jan. 28, 1992 [GB] United Kingdom ............ 9201740

[51] Int. Cl.$^6$ .................................. G01F 23/28
[52] U.S. Cl. ..................................... 73/290 V
[58] Field of Search ........................... 73/290 V

[56] References Cited

U.S. PATENT DOCUMENTS

| 3,019,650 | 2/1962 | Worswick | 73/290 V |
| 3,520,186 | 7/1970 | Adams et al. | 73/290 V |
| 4,063,457 | 12/1977 | Zekulin et al. | |
| 5,153,859 | 10/1992 | Chatigny et al. | 367/140 |

FOREIGN PATENT DOCUMENTS

| 231518 | 11/1960 | Australia | 73/290 V |
| 515254 | 11/1992 | European Pat. Off. | |
| 9010566 | 9/1990 | Germany | |
| 3912783 | 10/1990 | Germany | |
| 4106427 | 4/1992 | Japan | 73/290 V |
| 2119090 | 11/1983 | United Kingdom | 73/290 V |
| 82/04122 | 11/1982 | WIPO | |

OTHER PUBLICATIONS

Derwent Publications Ltd., Section EI, Week 9132 25 Sep. 1991.
K. Owada et al, A Two-Wire Ultrasonic Level Meter with Piezoelectric Polymer-Film Sensor, 1988.

*Primary Examiner*—William A. Cuchlinski, Jr.
*Assistant Examiner*—Willie Morris Worth
*Attorney, Agent, or Firm*—Ratner & Prestia

[57] ABSTRACT

The level of a liquid is detected by an ultrasonic arrangement comprising a transmitter and a receiver. The transmitter has a vertical array of transmitter segments which transmit sequentially, while the receiver is a single transducer. The transmitter and receiver are formed as a single assembly operating in pulse echo mode in conjunction with a passive reflector. The difference in transmission time in liquid and gas allows a digital, depth representative output to be generated. The transmitter is formed by securing a single sheet of piezo polymer film over a printed circuit board having a conductive pattern defining the segments.

25 Claims, 10 Drawing Sheets

LIQUID LEVEL SENSOR

FIELD OF THE INVENTION

This invention is relates to a device for sensing the level of liquid within a container and, particularly, to a device in the form of a solid state arrangement having no moving parts and readily adaptable to deal with containers of non-uniform shape.

SUMMARY OF THE INVENTION

There are applications where it is desirable to determine liquid level as a discrete, rather than continuous, function. An example of such a case is where the final display of level is desired to be a digital readout. Certain forms of the present invention provide a device which fulfils this function by providing a plurality of independent ultrasonic transducers disposed in such a way that the presence or absence of liquid between a given transmitter element and a given receiver element can readily be detected.

The invention and preferred features thereof are defined in the appended claims.

BRIEF DESCRIPTION OF THE DRAWINGS

Embodiments of the invention will now be described, by way of example only, with reference to the accompanying drawings, in which:

FIG. 2b is a sectional plan view of the sensor of FIG. 2a;

FIG. 4b is an enlarged view of part of FIG. 4a;

FIG. 4c is a cross-sectional side view of an embodiment using the pcb of FIG. 4a;

FIG. 8 shows signal strengths from the segments of the receiver of FIG. 7a;

FIG. 9 shows the ratiometric output of the receiver of FIG. 7a and

FIG. 10 illustrates one form of electronics suitable for use with the receiver of FIG. 7a.

DESCRIPTION OF THE PREFERRED EMBODIMENTS

Figure 1:
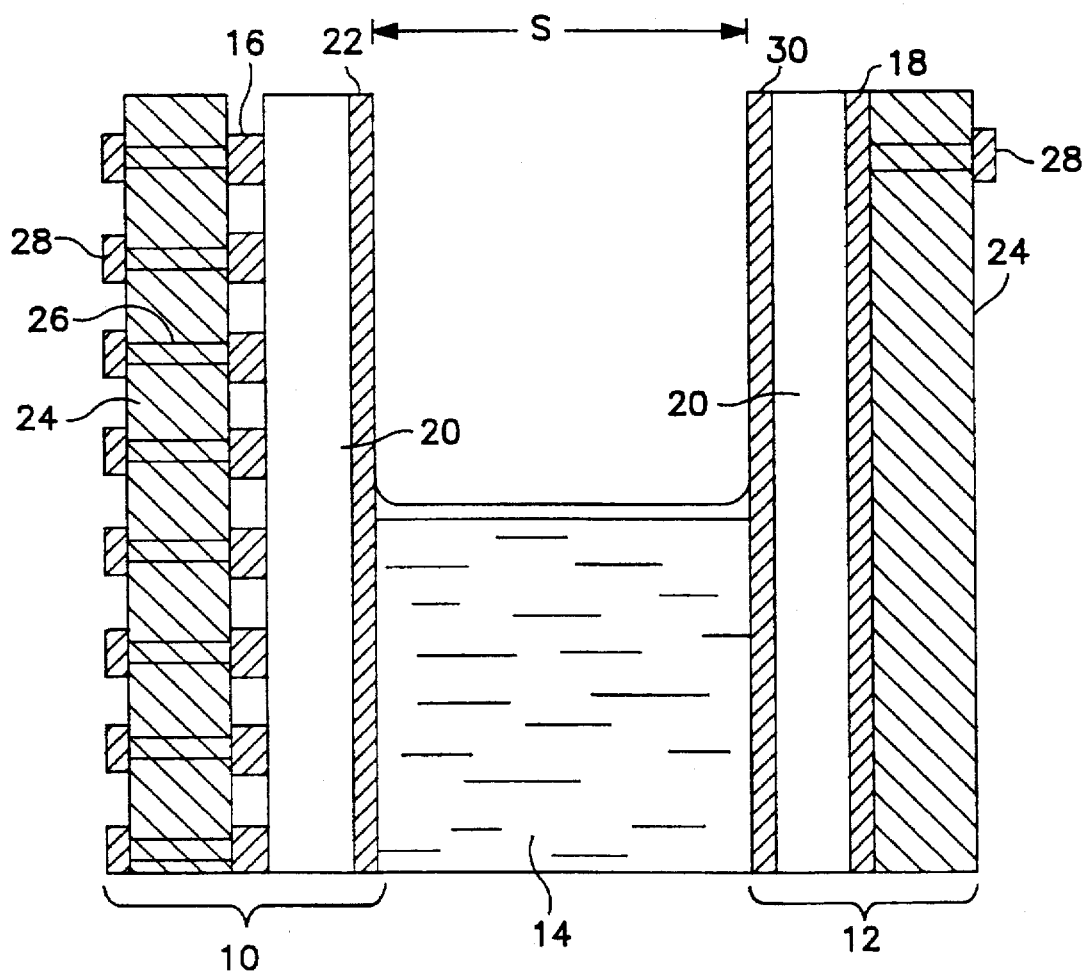
FIG. 1 is a schematic cross-sectional view of a liquid level sensor forming a first embodiment of the invention.

Referring to FIG. 1, a sensor comprises a pair of ultrasonic transducers 10, 12 mounted at a fixed separation S on either side of a container holding liquid 14, or directly immersed in liquid. One transducer 10 forms a transmitter and comprises a plurality of independent conductive (i.e., transmitter) segments 16 each of which may be individually addressed by associated drive electronics (not shown). The other transducer 12 forms a receiver and comprises a single conductive element 18 having a sufficient geometric extent to receive ultrasonic acoustic signals generated by activation of any of the transmitter segments 16.

The device of this embodiment is used in the following manner. An electrical stimulus is applied to each transmitter segment 16 in turn. The time delay between application of the stimulus and reception of the resulting acoustic signal may be calculated or measured for the specific liquid involved, and is governed by the speed of sound in the medium and by the physical separations of the transmitter 10 and receiver 12. If a signal has not been detected by the receiver 12 within the appropriate time window, then it can be concluded that the liquid has not reached the height of the given transmitter segment.

The above description, involving a plurality of independent segments 16 for the transmitter, would be difficult and costly to realize using physically separate piezoelectric elements.

It is a preferred feature of the invention, therefore, that the most successful reduction to practice will employ a continuous piezoelectric matrix 20 with one common electrical ground connection 22, together with a plurality of segments 16. (It is not necessary for the ground electrodes for each segment 16 to be separate.)

This can be accomplished if the mechanical coupling of acoustic energy is poor between closely-spaced electrodes: i.e. if the internal damping of the piezoelectric material 20 is great. One suitable piezoelectric material is suitably processed poly(vinylidene fluoride) (PVDF or PVF$_2$); another is vinylidene fluoride-trifluoroethylene (VF$_2$VF$_3$) copolymer.

Suitable patterning of the signal electrodes may be accomplished by the normal means, i.e. by vacuum depositing or sputtering the metallic electrode material through a mask, or by etching a continuous metallic layer to obtain the required pattern.

It is a further preferred feature of the invention, however, that the required patterning of one or both transducers may be formed in a simpler way: a continuous piezoelectric matrix may be laid down upon a patterned substrate. In particular, the patterned substrate may consist of printed circuit board (p.c.b.) 24 whereby etched lands of copper may form the segments 16. This method has the benefits of simple and robust construction using standard p.c.b. techniques, and avoids the requirement of a plurality of connections to be made to the somewhat delicate metallization which can be deposited on the piezoelectric polymer.

An additional benefit of using p.c.b. material as the backing layer is that double-sided beard may be used. Plated-through holes 26 then allow interconnection and wiring of all segments to be accomplished on the rear surface connection pads 28, leaving the front surface unhindered for application of the piezoelectric layer 20. A further benefit of using double-sided circuit board is that the rear side copper may be left substantially intact as shown at 30, and connected to ground potential, where the receiver design is considered. This affords good electrical shielding of the receiver element, so reducing the extent of the electromagnetically-coupled signal from the transmitter. It is of great importance that this "cross-talk" is minimised, to avoid saturation of the receiver circuitry, or false triggering, prior to the arrival of the true acoustic signal.

The piezoelectric polymer matrix 20 may be applied in two ways. One method is to use a sheet of said polymer, with metallization applied to the outer surface only. The inner surface may be bonded to the patterned p.c.b. material 24 by a number of adhesive methods, for instance, using epoxy resin. The adhesive layer so introduced is normally thin in relation to the thickness of the piezoelectric polymer employed. The electrical signal applied to or generated by such an assembly will be capacitively coupled through the additional dielectric layer formed by the adhesive.

An alternative method of applying the piezopolymer matrix can be employed where the piezoelectric material used is the $VF_2VF_3$ copolymer mentioned above. This material may initially consist of a solution which can be applied by casting or spin-casting directly on the p.c.b. material. After evaporation of the solvent, the resulting layer must then be polarized as part of the process whereby it is rendered piezoelectric: this polarization may be preferably applied only at the regions of the signal electrodes. Thus, only the polymer material lying above each patterned electrode may be considered to be piezolectric, while the material between each electrode may be considered inert. Suitable polarization procedures are well known to those in the art.

The control circuitry associated with the device of the foregoing embodiment is required to fulfil the following functions:

1) to generate an electrical signal of sufficient amplitude and frequency to create a useful acoustic signal from the transmitter segments.

2) to apply the abovementioned electrical signal to each transmitter segment in turn.

3) to amplify and threshold the receiver signal

In addition, the following functions may be desirable:

4) to generate timing pulses to gate the transmitter signal since only a short burst is required 5) to generate other timing pulses to gate the receiver, in such a way as to prevent any other signal than the possible arrival of the acoustic wave being amplified 6) to provide counting and logic to allow generation of a numerical output corresponding to the "index number" of the appropriate segment being the last to indicate presence or absence, if "top downwards" logic is used or fluid.

The system is capable of a self-check function. It is possible to drive the piezoelectric transducers at such a frequency that the acoustic signal may be transmitted successfully through air as well as liquid, although with different transmission delay. In this case, the operation of all segments may be verified periodically.

In a preferred form of the embodiment described, the electrical signal applied to the transmitter has substantial energy content in the frequency range 200 kHz to 5 MHz. The time duration of the applied signal may vary widely, between a very fast spike and a step function of indeterminate length. A rectangular pulse of 0.1 to 10 µs is preferred, especially about 0.2 µs. The spacing S between the transmitter 10 and the receiver 12 may suitably be between 1 mm and 25 mm. The piezoelectric films 20 may suitably have a thickness of 0.1 µm to 500 µm; it his been found however that the electrical behaviour is substantially independent of film thickness and any available film thickness will produce a usable result.

A possible modification of the foregoing embodiment of the present invention would use a receiver transducer of the same construction as the transmitter; in other words, the system would comprise two identical linear arrays, with the electrical stimulus being applied to each transmitter segment in turn, while the corresponding receiver segment is monitored for the arrival or non-arrival of the acoustic signal.

This embodiment offers greater electrical signal strength of the detected receiver signal since, in effect, the entire area of each receiver segment may be excited by the incidence of the acoustic wave, but this method increases the complexity of the associated electronic circuitry.

It is envisaged that the height of each transmitter segment 16 be small, to allow a large number of segments within the range of the sensor, and that the spacing between each segment be either regular or varied, according to the geometry of the container.

A further optional feature of the invention is that the propagation delay of the acoustic signal from transmitter to receiver may be measured, and so knowledge obtained regarding the composition of the liquid. An example of this application would be when a possibility exists of contamination of gasoline with water, where the water forms a layer at the bottom of the container. Where the speeds of sound are sufficiently distinct, and where a suitably short acoustic pulse or burst of pulses can be sent, then appropriate control signals can be generated to detect abnormal early reception of the acoustic signal. The speed information can be examined for each segment in turn, and thus a profile of the characteristics of the liquid column can be developed.

The digital nature of the output produced by the foregoing embodiment lends itself to further digital transmission and processing. As one example, each level may have a corresponding weighting factor applied from a look-up table held in a ROM or the like, to provide a user output in terms of liquid volume rather than liquid depth. This is particularly useful in monitoring the contents of tanks having irregular stapes.

Figure 2A:
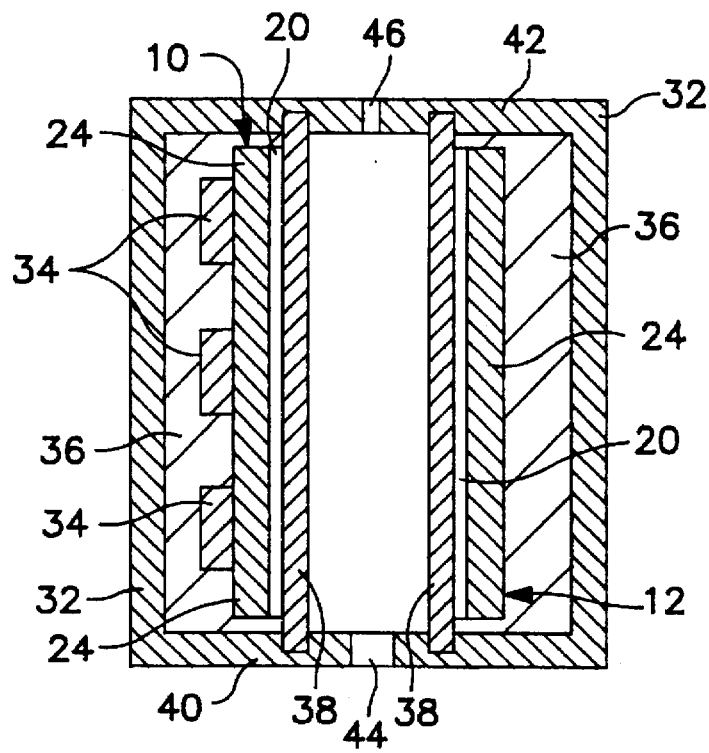
FIG. 2a is a cross-sectional side view of a second embodiment of sensor.
Figure 2B:
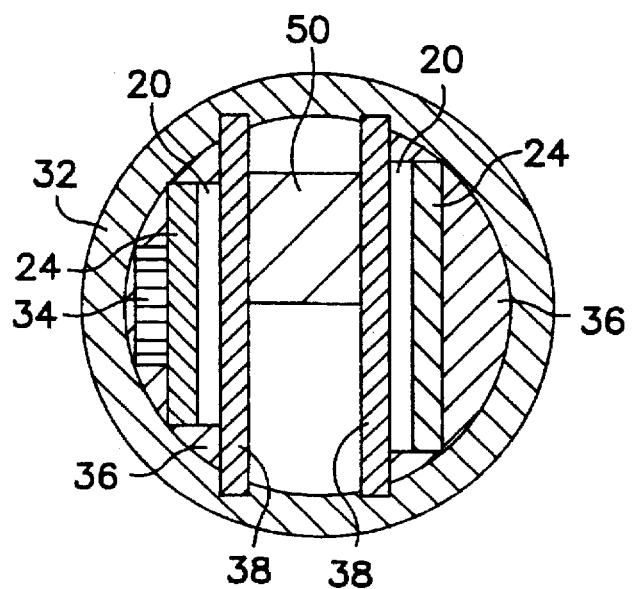

FIG. 2 illustrates a modified version of the embodiment of FIG. 1. Once again, the transducers 10, 12 comprise pcb's 24 carrying piezo films 20. These are mounted within a housing in the form of an extruded polymer tube 32 which is placed within the tank (not shown). The electronic components 34, which may suitably be surface mount devices, are mounted directly on the conductor patterns on the rear side of the transmitter pcb 24.

To afford the components 34 protection from chemical attack, electrolytic corrosion and the like, the cavities formed between the tube 32 and the pcb's 24 are filled with an encapsulation material 36 such as epoxy resin. The piezo films 20 are less prone to attack, but the metallized surfaces may be chemically attacked or corroded. Protective coatings 38 are therefore provided. The coatings 38 may be conformal coatings of suitable protective material, for example epoxy resin, applied in any suitable way such as dipping, brushing or spraying. Alternatively, the coatings 38 may be provided by bonding a thin sheet of inert, stable polymer onto the front face of the transducer in such a way that, as shown in FIG. 2, the polymer sheet itself acts to locate the assembly within the tube 32.

Said suitable inert polymers may be, for example only, polyethylene (UHMW or HDPE) or polyvinylidene fluoride (PVDF, Kynar), or others.

Some effect on the acoustic transmission is expected from the application of a front-face layer—it is found, in general, that the bandwidth of the ultrasonic device so formed is somewhat reduced. Thicknesses of 0.5 mm to 1.0 mm of HDPE have been found to allow satisfactory operation. It is a feature of the piezopolymers employed (PVDF or $VF_2VF_3$) that their acoustic impedance closely matches those materials found to be suitable as protective layers. Thus the transfer of acoustic energy remains acceptable.

The use of an extruded tube 32 (which may be circular or rectangular in section) allows the possibility of forming it with mounting grooves or ribs for the pcb's and other assembly aids.

As also seen in FIG. 2, the housing is substantially closed by end caps 40, 42 on the tube 32. The lower end cap 40 is provided with a restricted aperture 44 for entry and exit of the liquid, and an air bleed aperture 46 is provided in the upper end cap 42. This provides a damping effect on the rate of liquid level change and, especially in conjunction with a narrow spacing between the transducers, greatly limits the effects of liquid surging or "slosh". If necessary, the internal cavity can be further provided with baffles (not shown).

Figure 3:
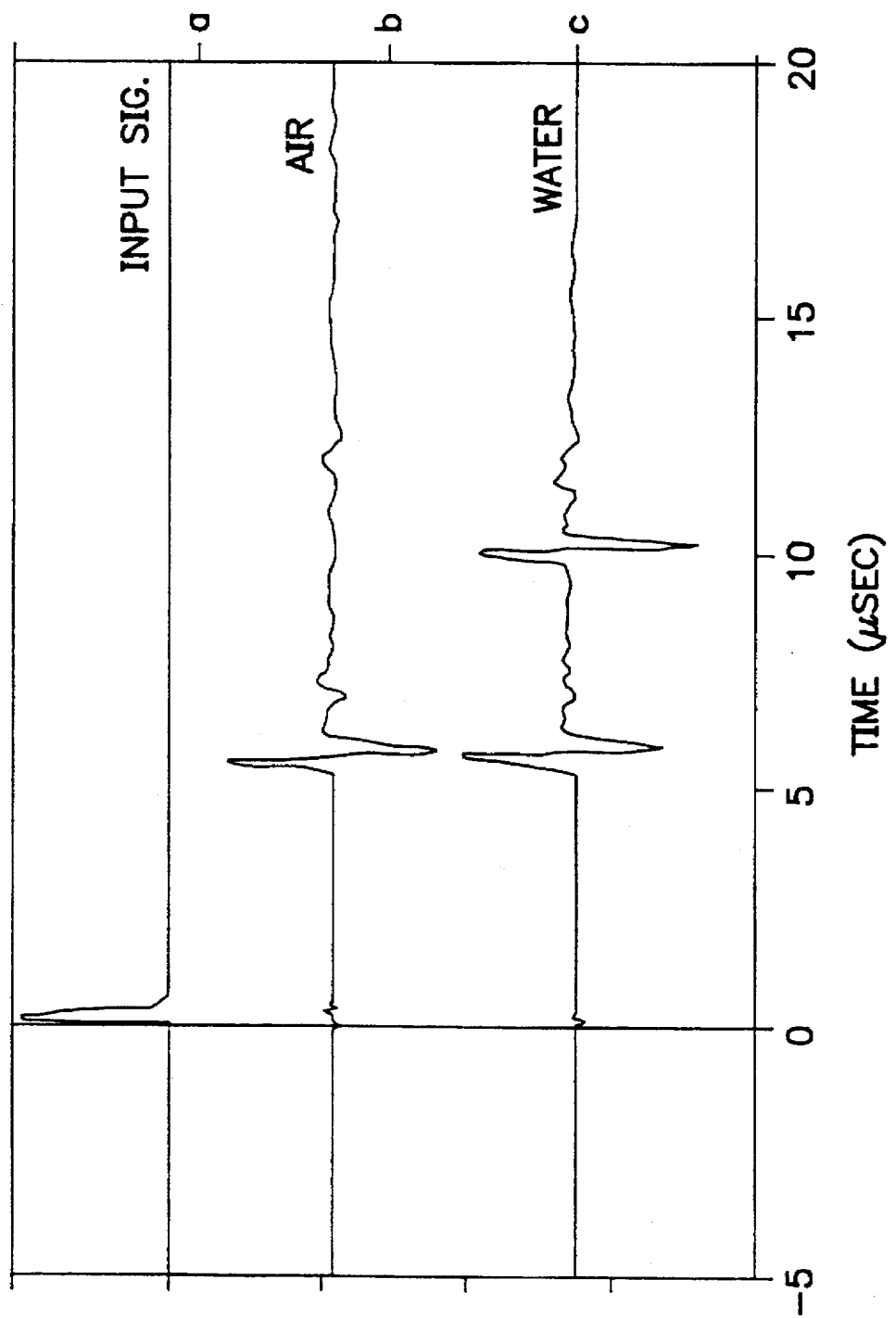
FIG. 3 is a graph illustrating the operation of one aspect of the sensor of FIG.2.

A further optional feature illustrated in FIG. 2 is a self-test capability. A block 50 of solid material is disposed between the transducers 10, 12 in such a manner that it links part of each transmitter segment directly to the receiver. With this arrangement, the transmission of a pulse from a transmitter segment causes a pulse to be received via the block 50 before any transmission through the liquid. This is illustrated in FIG. 3, in which (a) represents a short, unipolar transmitted pulse, (b) represents the receiver signal in air, with a distinct pulse being received only via the solid block, and (c) represents the receiver signal in water, the second distinct pulse being the transmission via the water. Suitable materials for the block 50 are polymers such as high-density polyethylene and polymethylmethacrylate. The example of FIG. 3 was measured with a PMMA spacer of 14.6 mm thickness covering 50% of each transmitter segment.

This feature can be used to give warning of a system failure, since in normal operation a pulse will be received a given time after every transmitted pulse.

In a further modified embodiment, the spaced transmitter and receiver transducers are replaced by a single transmitter/receiver assembly operating in pulse-echo mode in conjunction with a passive reflector. It is known in other applications of ultrasonics to use pulse-echo techniques. Conventionally, this requires a receiver to be switched at appropriate times to avoid it detecting the transmitted pulse. In the present application with a short transmission path and a number of transmitters, such switching would be possible but would be complex and expensive to implement.

Figure 4A:
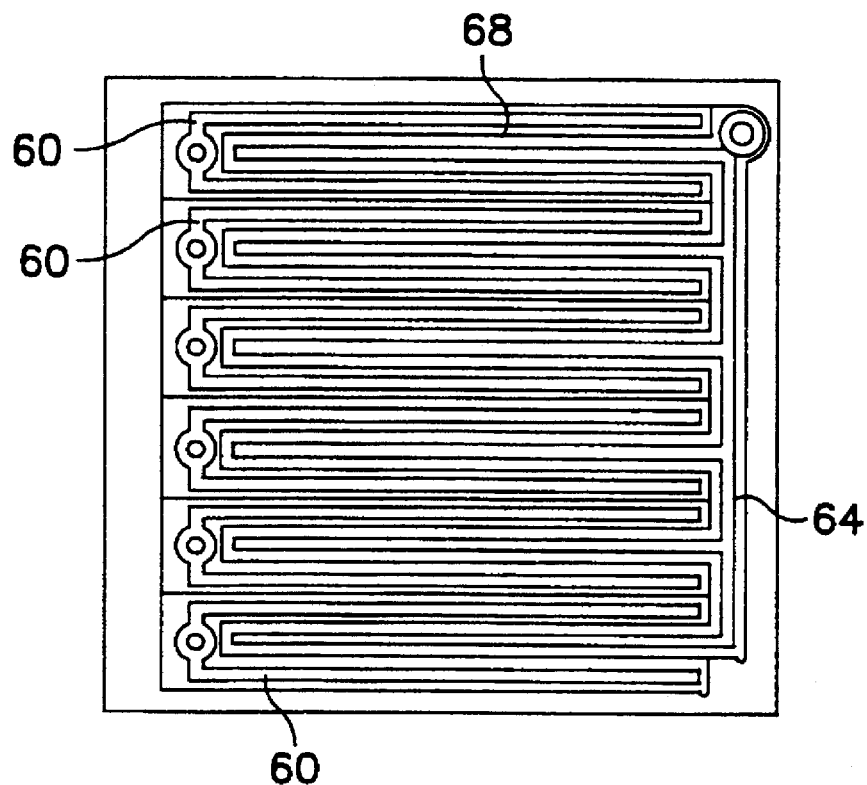
FIG. 4a shows a pcb track layout used in a third embodiment.

However, a pulse-echo form of the present invention can be implemented in a simpler manner, as will now be described. FIG. 4a illustrates a prototype transmitter/receiver assembly incorporating six transmitter segments and a common receiver. As in the above embodiments, the assembly makes use of piezo film secured to a pcb. FIG. 4a shows the track layout of the pcb, while FIG. 4b shows part of the track layout in greater detail.

Each transmitter segment 60 is formed by a pair of spaced strips 60a, 60b interleaved by a receiver strip 62. The receiver strips are connected together at 64, while each transmitter segment 60 is connected independently to the associated circuitry by a via 66. The overall effect is therefore a series of transmitter segments, and a common receiver segment of large area, but comprising an array of interdigital parts.

The transmitter segments 60 are fired individually in the same manner as in the embodiments of FIGS. 1 and 2, and the same receiver processing is used. Instead of a separate pcb, all that is required is a passive reflector (which could be a separate item, or simply the wall of the tank) at a suitable spacing to give sufficient time delay for any directly coupled crosstalk to subside. To minimise breakthrough of the drive signal from transmitter to receiver electrodes, a continuous ground conductor 68 is preferably interleaved between them. It is also preferable to interlay a plane of copper which is substantially unbroken (except for the vias such as 66 carrying signals through this layer to the component side) which serves as a ground plane. Thus, the receiver strips 62 will see a ground plane to the rear (the mid-board copper), to each side (the conductor 68), and also to the front (the piezo film metallization).

Figure 4B:
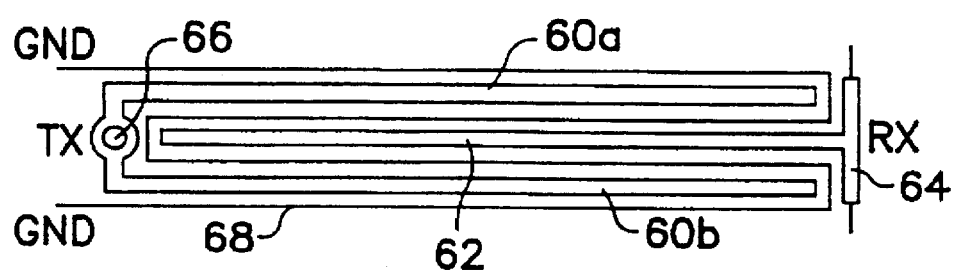
Figure 4C:
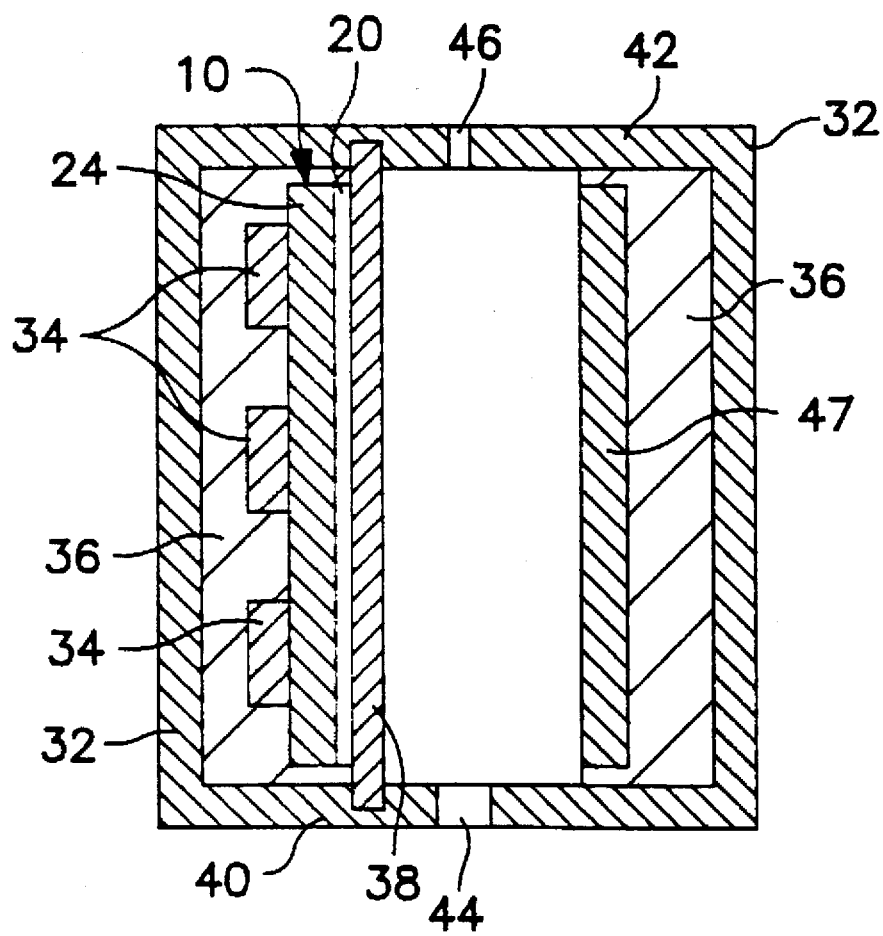

FIG. 4c shows an embodiment of the invention, in which the sensor of FIG. 2 is modified to make use of the pcb of FIGS. 4a and 4b. In FIG. 4c, the pcb 24 operates in conjunction with a passive reflective surface 47. The sensor is otherwise similar to that of FIG. 2 with like references.

The convenience and accuracy of the foregoing systems are clear, but situations may arise where an inherently digital output is not required. As mentioned above, the digital output may be converted into analogue form, with some increase in complexity. It is also possible, however, to use similar construction techniques and materials to provide an accurate, analogue measurement.

Turning to FIGS. 5 to 10, consider first a simple ultrasonic transmitter/receiver system where both transducers are plain, rectangular elements, formed by bonding piezoelectric polymer film onto a suitable substrate e.g. printed circuit board material. As the liquid level between the two plates rises, the acoustic coupling of signal will increase in a linear fashion from zero to a maximum value.

This linear response may be converted easily into an analogue voltage. However, any change in sensitivity of the two transducers will create problems in calibration. The piezo coefficients of the polymer are known to change with temperature, and the required range is broad for certain applications (−40° to +85° C. is typical for automotive).

It is thus desirable to develop a method such that the final output is substantially independent of the absolute value of the received signal.

Figure 5:
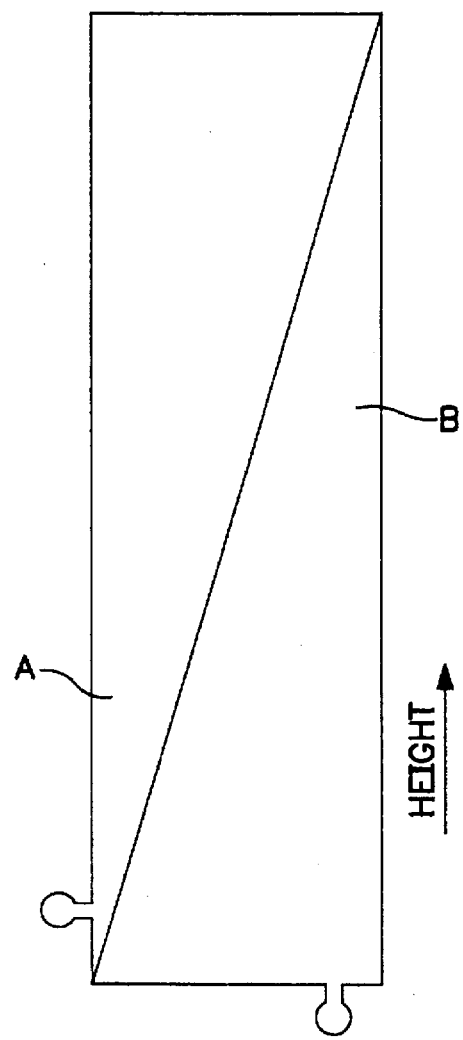
FIG. 5 illustrates a two-segment receiver of a second embodiment, the receiver having equal but opposite receiver segments.
Figure 6:
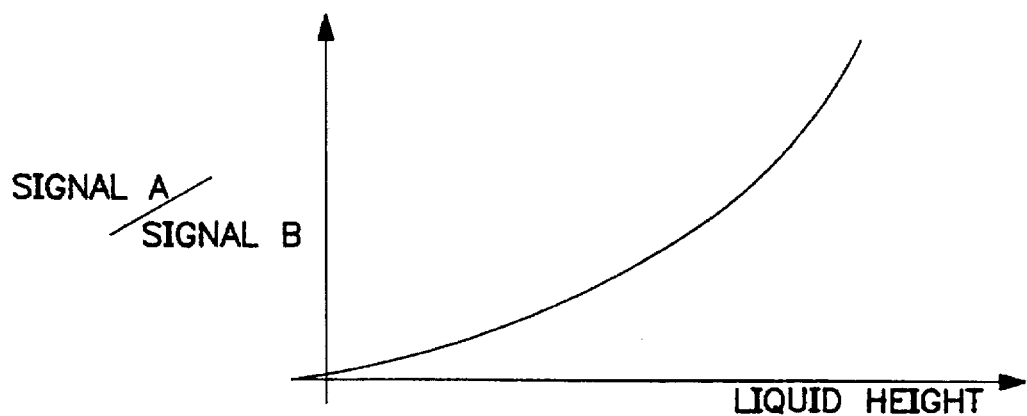
FIG. 6 shows the ratiometric output of the receiver of FIG. 5.

Consider next a similar system, but where the rectangular receiver element is split diagonally into two independent, triangular receiver areas A and B as shown in FIG. 5. The transmitter is once again a solid rectangle, mounted in opposition to the receiver. As the fluid level rises in such an assembly, we can examine the ratio of the output signal amplitude of receiver A to receiver B, which will increase over the range of fluid height. The curve will not be linear, but approximately quadratic, as in FIG. 6. It would be possible to "linearise" such a function electronically, but it is also possible to pattern the receivers to arrange a linear ratio function.

It can be shown that a specific function $$f(x)=(2x/(1+x))-(x^2/(1+x)^2)$$

where x represents the varying immersion depth describes a curve which splits the rectangular receiver area into two portions, each of equal area, such that the ratio of their areas immersed will change from zero to unity in a linear function of depth.

The "area function" of one receiver segment is given by the integral of f(x):

$$g(x)=\int f(x)dx=x^2/(1+x)$$

while the other receiver segment has area x−g(x).

The signal output from each receiver is found to be directly proportional to the "area function" g(x).

Figure 7A:
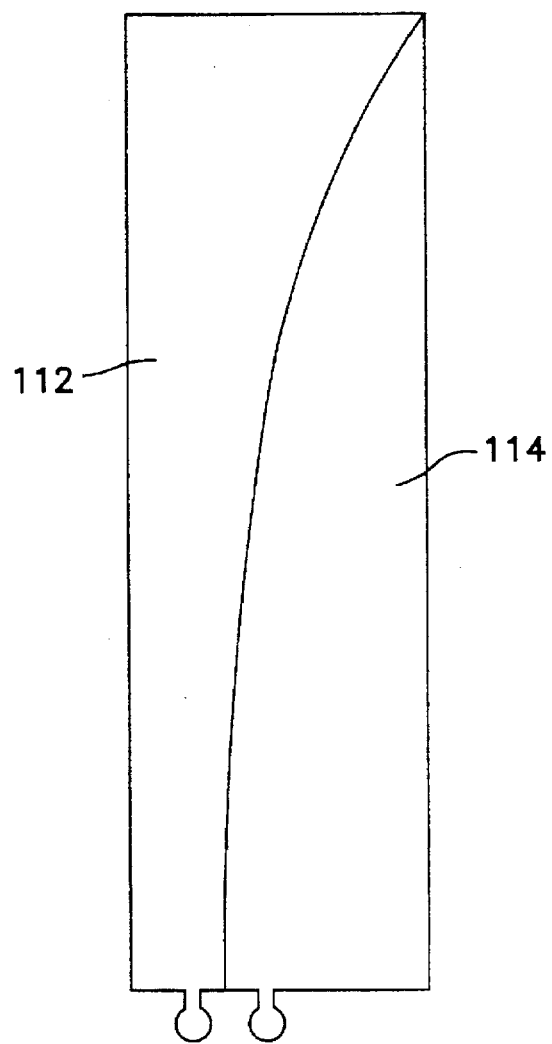
FIGS. 7a and 7b illustrate a two-segment receiver similar to that of FIG. 5 but having segments defined by a non-uniform curve.
Figure 7B:
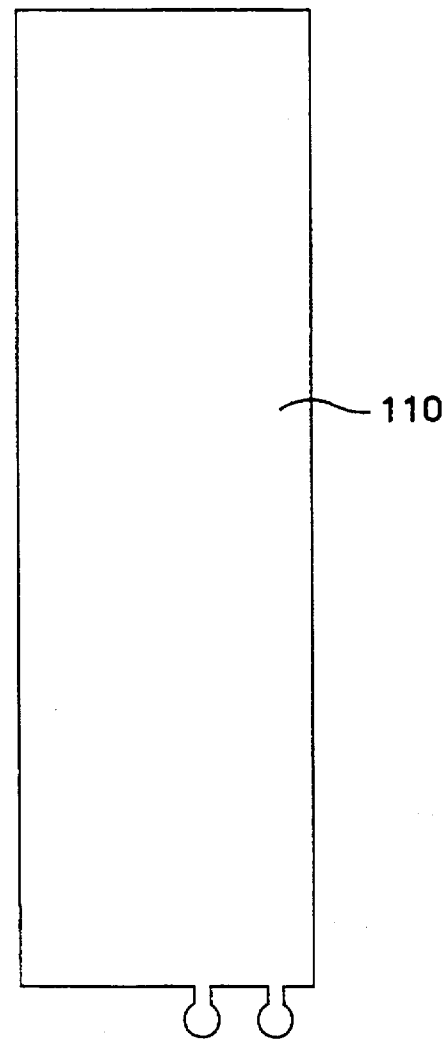
Figure 8:
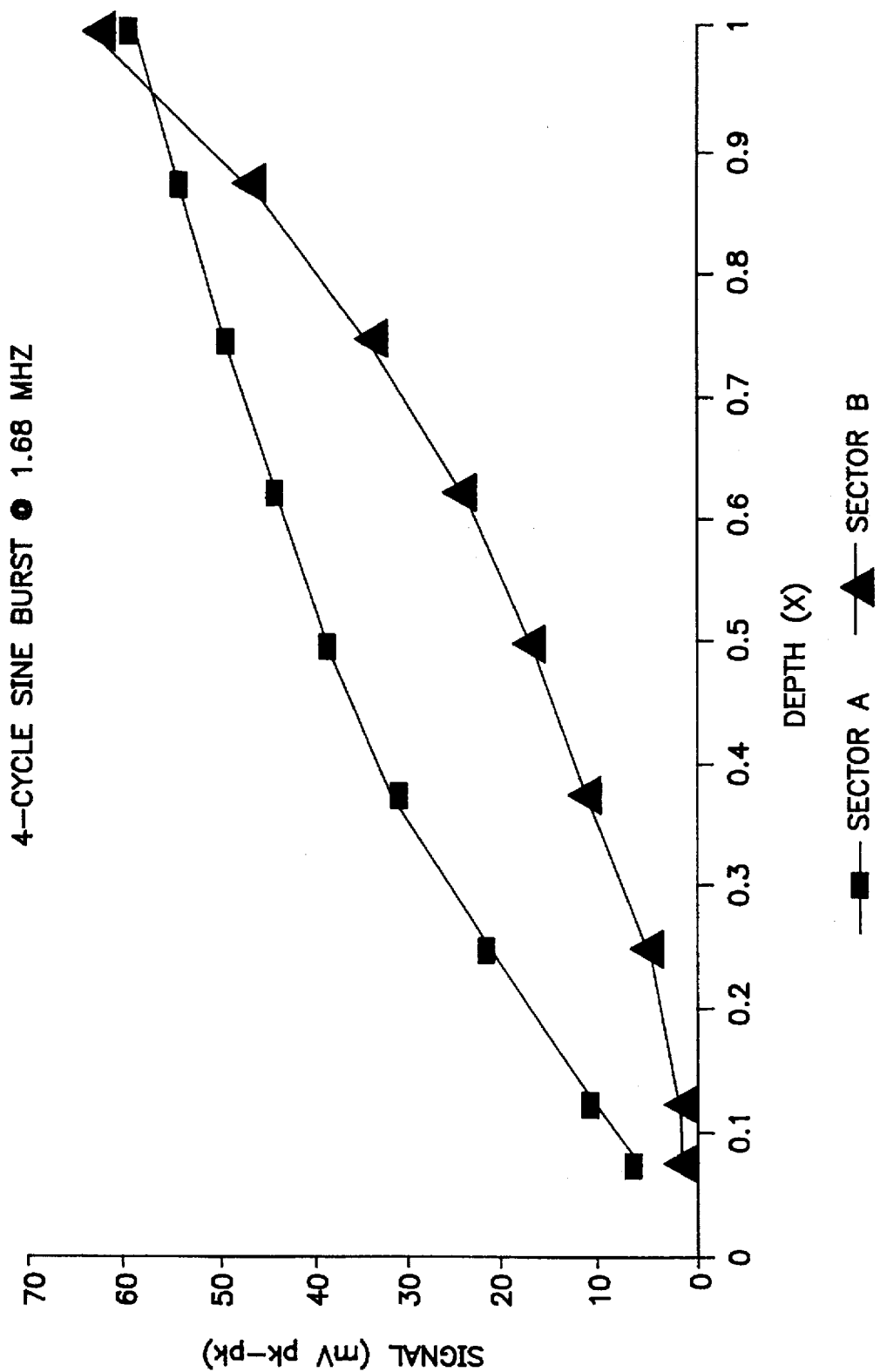
Figure 9:
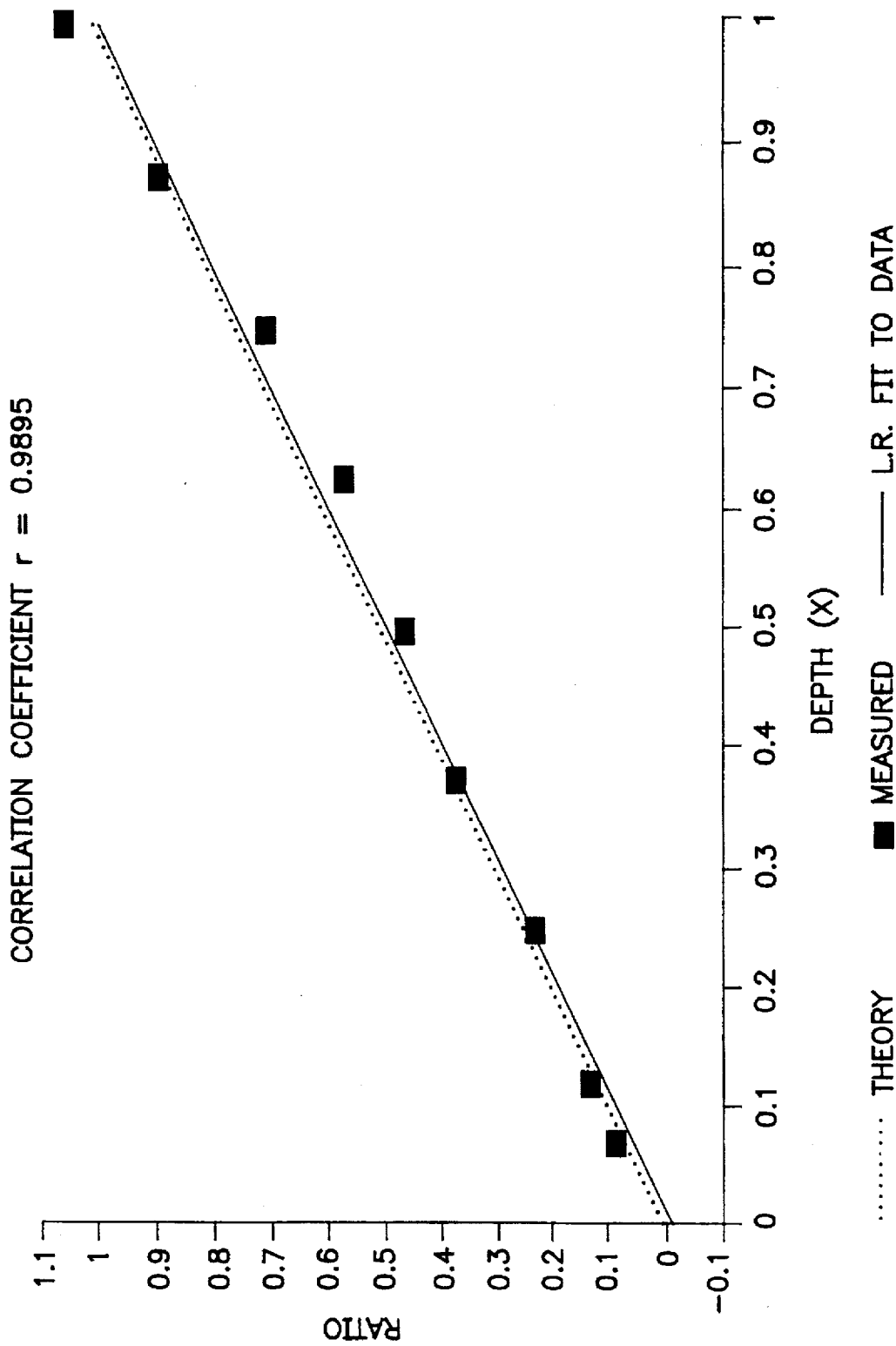

FIG. 7a and 7b (referred to collectively as FIG. 7) illustrate suitable electrode patterns, the transmitter electrode being shown at 110 and the split receiver electrodes at 112 and 114. FIGS. 8 and 9 show graphically the absolute signal strength and signal strength ratio produced experimentally by the transmitter and receiver of FIG. 7. The ratiometric output shows good approximation to a linear response.

Note that for the extreme "empty" condition, both the dividend and the divisor tend to zero, and so the electronic output will be undefined. Several methods may be adopted to prevent malfunction. For example, the absolute value of the "reference channel" (divisor) signal strength may be examined, and appropriate action taken if it lies below the detection threshold. The output may be blanked or simply indicated as "low level".

Alternatively, a small additional receiver segment extending from zero to critical depth may be patterned, such that the division is only performed if this segment is "fully on".

Figure 10:
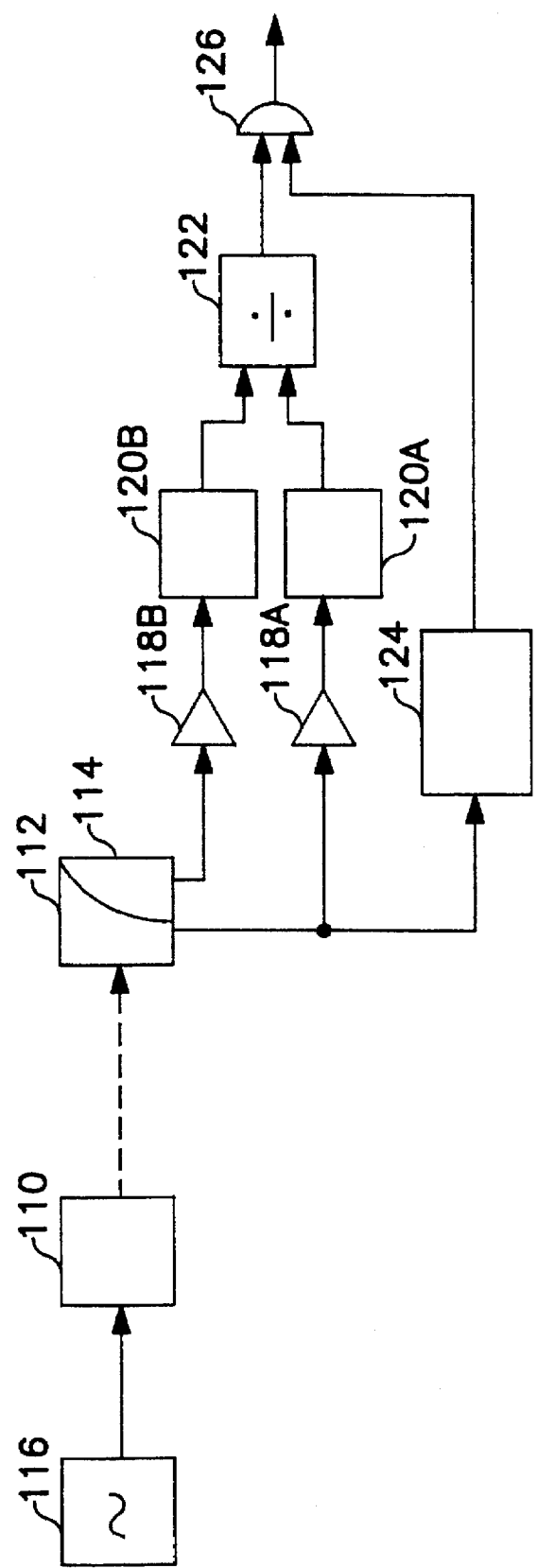

One example of the electronics required for a basic measurement system using the sensor of FIG. 7 is shown in FIG. 10. The transmitter 10 is driven by an oscillator 46 which may supply a constant or burst signal at suitable frequency, typically 0.5–1.5 MHz, and moderate amplitude, typically 1–20 volts peak-to-peak. The outputs of the receiver segments 112, 114 are fed via dual, matched gain stages 118A and 118B to dual peek detectors 120A, 120B to give absolute signal strength inputs to analog divider circuit 122. The peak detectors 120 may have short hold times, or alternatively RMS-to-DC converters may be used. The analog divider 122 may suitably be AD532, AD534 or AD538. A threshold detector 124 operates gate 126 to blank the output when the received signal is close to zero.

In a modified form of the foregoing embodiment, the curve defining each receiver segment may be adjusted to compensate for non-uniformity of the container cross-section, such that the relationship between ratiometric signal output and liquid volume remains constant.

I claim:

1. A liquid level sensor device comprising a transmitter and a receiver of ultrasonic energy, the transmitter for transmitting pulses to the receiver along a transmission path of known length, and adapted to be positioned in a liquid container such that liquid in the container is present in the transmission path, the transmitter comprising a plurality of individually addressable independent segments spaced apart in the direction of liquid depth, the segments comprising conductive signal electrodes, where the transmitter and receiver are formed as a single assembly operating in pulse-echo mode in conjunction with a passive reflector in the transmission path.

2. A sensor device according to claim 1, wherein the transmitter and receiver comprise a piezoelectric film mounted on a printed circuit board (pcb).

3. A sensor device according to claim 2, wherein the pcb has a track layout that comprises the signal electrodes.

4. A device according to claim 3, wherein the piezoelectric film is made of poly vinylidene fluoride or vinylidene fluoride-trifluoroethylene copolymer.

5. A device according to claim 1, in which the depthwise spacing between segments is non-uniform.

6. A device according to claim 2, in which the piezoelectric film is protected from the liquid by an overlying protective coating or sheet.

7. A device according to claim 1, in which the transmitter and receiver are mounted within a tube for immersion in a tank.

8. A device according to claim 7, in which the tube is substantially closed except for restricted orifice means which limit the rate of liquid flow into and out of the tube.

9. A liquid level sensor device comprising a transmitter and receiver of ultrasonic energy; the transmitter for transmitting pulses to the receiver along a transmission path of known length, and adapted to be positioned in a liquid container such that liquid in the container is present in the transmission path, the transmitter comprising a plurality of individually addressable independent segments spaced apart in the direction of liquid depth, the segments comprising conductive signal electrodes, wherein the transmitter comprises a patterned substrate, and a piezoelectric matrix mounted thereon.

10. A sensor device according to claim 9, wherein the conductive signal electrodes are mounted on the substrate.

11. A sensor device according to claim 10, wherein the transmitter comprises a single continuous said piezoelectric matrix.

12. A device according to claim 11, in which the piezoelectric matrix is made of polymeric material.

13. A device according to claim 9, in which the depthwise spacing between segments is non-uniform.

14. A device according to claim 9, in which the piezoelectric matrix is protected from the liquid by an overlying protective coating or sheet.

15. A device according to claim 9, in which the patterned substrate is a printed circuit board (pcb).

16. A device according to claim 15, in which the pcb is copper clad on both sides.

17. A device according to claim 16, wherein one side of the pcb has substantially continuous copper serving as electrical shielding.

18. A device according to claim 16, in which the copper cladding of one side of the printed circuit board is formed into said segments to which connection are made by plated-through holes.

19. A device according to claim 16, in which one side of the printed circuit board bears conductive pattern defining said segments and the other side of the printed circuit board bears a conductive pattern for direct mounting of associated circuit components.

20. A device according to claim 11, in which the transmitter and receiver are mounted within a tube for immersion in a tank.

21. A device according to claim 20, in which the tube is substantially closed except for restricted orifice means limited to the rate of liquid flow into and out of the tube.

22. A liquid level sensor device comprising a transmitter and receiver of ultrasonic energy, the transmitter for transmitting pulses to the receiver along a transmission path, the device to be positioned in a liquid container such that liquid in the container is present in the transmission path, wherein the receiver comprises a piezoelectric material patterned to form two independent active area segments, each segment having a width that varies along the liquid height in a manner differing from the other such that the ratio of signal strengths of one segment with respect to the other varies dependent on the liquid height.

23. A device according to claim 2, in which the widths of the segments vary in such a manner that the ratio of signal strengths increases substantially as a linear function of liquid height.

24. A device according to claim 22, including a further receiver segment adjacent to zero liquid level for producing a signal for controlling the determination of the ratio of signal strengths.

25. A device according to claim 22 including a threshold detector connected to one of the receiver segments to produce a signal indicating that liquid level is below a detection threshold.

* * * * *

UNITED STATES PATENT AND TRADE MARK OFFICE
CERTIFICATE OF CORRECTION

PATENT NO.   : 5,697,248
DATED        : December 16, 1997
INVENTOR(S)  : Richard Hunter Brown It is certified that error appears in the above-identified patent and that said Letters Patent is hereby corrected as shown below:

In column 7, line 64 (claim 9), delete the " ; " and substitute therefor -- , --.

In column 8, line 53 (claim 23), delete the "2" and substitute therefor --22--.

Signed and Sealed this

Tenth Day of March, 1998

BRUCE LEHMAN

*Attest:*

*Attesting Officer*    *Commissioner of Patents and Trademarks*